3,773,792
ACETATES OF PLICATIC ACID AND PROCESSES
FOR THE PREPARATION THEREOF
Donald W. Langille, deceased, late of Vancouver, British Columbia, Canada, by Olive I. Langille, executrix, Vancouver, British Columbia, Canada, assignor to ITT Rayonier Incorporated
No Drawing. Continuation of abandoned application Ser. No. 425,066, Jan. 12, 1965. This application Mar. 8, 1968, Ser. No. 712,337
Int. Cl. C07d 5/32
U.S. Cl. 260—343.3    4 Claims

ABSTRACT OF THE DISCLOSURE

A highly reactive, colorless, crystalline acetate of plicatic acid is prepared by dissolving plicatic acid in a suitable, relatively inert polar solvent such as ethyl acetate and then acetylating it with acetic anhydride in the presence of a catalyst (preferably perchloric acid). The crystalline acetate of plicatic acid (empirical formula: $C_{32}H_{30}O_{14} \cdot 2H_2O$) is precipitated from the solution by the addition of an excess of water, sodium acetate solution or an aliphatic alcohol. The colorless, crystalline acetate is useful as an intermediary from which other useful compounds such as paint pigments, dyes and the like can be formed. In addition, a yellow pigment (empirical formula: $C_{24}H_{24}O_{11}$) is prepared by the hydrolytic deacetylation of the foregoing colorless, crystalline acetate of plicatic acid with either concentrated sulfuric acid or dilute sodium hydroxide at ambient temperatures and under the proper conditions. The yellow deacetylation product is a good paint pigment and also forms lakes with iron and aluminium that are useful in dyeing cotton goods mordanted with these metals. Cellulose acetate yarns treated with a sodium bicarbonate solution of the deacetylated product is dyed a stable blue color.

BACKGROUND OF THE INVENTION

This is a continuation of my copending application Ser. No. 425,066 filed Jan. 12, 1965, now abandoned, entitled "Products From Plicatic Acid and Process for Making Them."

Plicatic acid is obtained from aqueous extracts of western red cedar wood. It has the following structure as shown by its chemical degradation products and X-ray crystallography in investigations by Gardener, Barton and MasLean, Can. J. Chem. 37, 1703–9 (1959); Gardner, MacDonald and MacLean, Can. J. Chem. 38 2387–94 (1960) and Gardner, Swan, Sutherland and MacLean, Can. J. Chem. 44, 52–8 (1966).

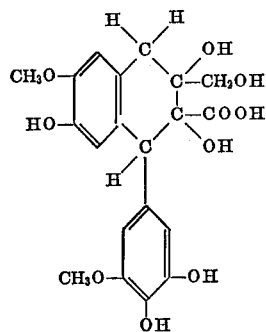

Processes for the separation and recovery of plicatic acid from the aqueous extract of western red cedar are described in U.S. patent applications Ser. No. 386,429 by D. W. Langille and K. R. Gray, filed July 30, 1964, and now abandoned, and Ser. No. 687,092 by J. Howard and T. D. McIntosh, filed Dec. 1, 1967, now U.S. Pat. 3,716,574.

In my copending application Ser. No. 425,066, now abandoned, I have disclosed a process for preparing a new, highly reactive, colorless, crystalline acetate of plicatic acid and also several new colored compounds that are derived therefrom. The colorless, crystalline acetate is a useful intermediary from which other useful compounds such as paint pigments, dyes, etc., can be formed. In particular, the brilliant yellow deacetylation product of the crystalline acetate of plicatic acid is an especially good paint pigments and also forms lakes with iron and aluminum that are useful in dyeing cotton goods mordanted with these metals. Cellulose acetate yarn treated with a sodium bicarbonate solution of the deacetylated product is dyed a stable blue color.

At the time the aforesaid application S.N. 425,066 was filed, the precise chemical structure of the crystalline acetate of plicatic acid and of the yellow pigment prepared therefrom had not been determined, and both of these new compounds were described in terms of the process by which they were prepared and in terms of such physical properties as color, solubility, melting point, and the like. Subsequent to the filing of application Ser. No. 425,066, now abandoned, the precise chemical structure of both of these plicatic acid derivatives has been determined by analytical techniques known in the art, as hereinafter set forth.

SUMMARY OF THE INVENTION

In preparing the compounds of the invention, plicatic acid is dissolved in a relatively inert polar solvent such as ethyl acetate. Acetic anhydride is then added to the solution, followed by the gradual addition of a suitable catalyst (preferably perchloric acid) with vigorous and constant agitation. The acetylation reaction takes place promptly, after which the product can be precipitated from solution in the form of dense, colorless, easily filterable crystals by the addition of water, sodium acetate solution or an aliphatic alcohol. The crystalline acetate of plicatic acid has a melting point of 234° C. and has the empirical formula $C_{32}H_{30}O_{14} \cdot 2H_2O$.

The yellow pigment is prepared by the hydrolytic deacetylation of the aforesaid crystalline plicatic acid acetate in either an acid medium (for example, an aqueous solution of sulfuric acid) or an alkaline medium (for example, an aqueous solution of sodium hydroxide). The yellow pigment recovered following either the acidic or alkaline deacetylation reaction has been shown by chemical, infrared and NMR spectrographic analysis to be the same compound having a melting point of 239° C. and the empirical formula $C_{24}H_{24}O_{11}$.

DETAILED DESCRIPTION

The crystalline acetate of plicatic acid is prepared in accordance with my invention by dissolving plicatic acid in a suitable organic solvent followed by acetylation of the acid solution in the presence of a suitable catalyst. The plicatic acid employed may be in pure form or in the form of the dried aqueous extract of western red cedar wood. In the preferred practice of my invention, plicatic acid is disolved in ethyl acetate, acetic anhydride is added to the solution, and a catalyst (preferably, perchloric acid) is gradually added to the reaction solution accompanied by vigorous agitation. Upon completion of the acetylation reaction, dense, colorless crystals of the plicatic acid acetate product are precipitated from the solution by the addition of water, sodium acetate solution or an aliphatic alcohol thereto. The crystals are filtered from the solution, washed and dried to obtain a pure colorless crystalline product having the following structural formula, as determined by conventional analytical techniques:

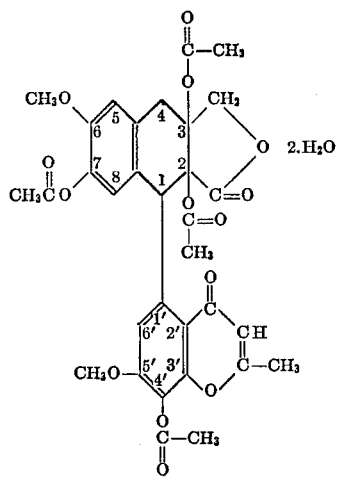

Hydrolytic deacetylation of this crystalline plicatic acid acetate product yields a bright yellow compound that is stable to light, that has excellent tinctorial properties and that forms lakes with iron and aluminum. The deacetylation reaction can be carried out in either an acid or alkaline media, both giving excellent yields of the crystalline yellow product. Deacetylation in acid media takes place when the colorless acetate crystals are disolved in concentrated sulfuric acid. Upon completion of hydrolysis the product can be precipitated by carefully stirring the solution into an excess of cold water. The dense yellow precipitate that forms is water-insoluble and can be easily filtered off, washed and dried. When alkaline media are used for deacetylation, the colorless acetate crystals are dissolved in dilute sodium hydroxide solution and form a orange-red solution. On completion of hydrolysis sufficient mineral acid is stirred into the solution to neutralize the alkali whereupon the desired yellow compound comes down as a dense yellow precipitate as before and can be easily filtered off, washed and dried. The yellow deacetylation product, regardless of whether formed from the acetate by hydrolysis in acid or alkaline media, has the following tautomeric structure, as determined by conventional analytical techniques.

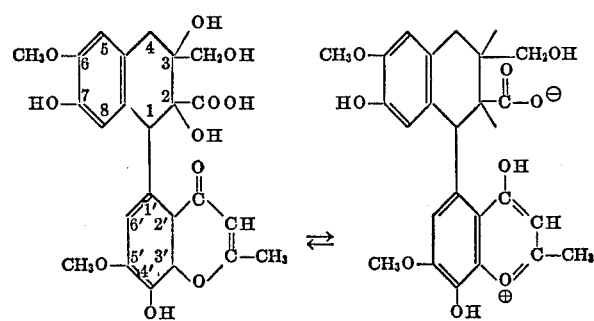

The following examples illustrate the processes and products of the invention in more detail.

Example 1

A large sample of a spray-dried aqueous extract of western red cedar wood (*Thuja plicata*), containing from 40 to 50% of plicatic acid on a weight basis, was dried overnight at 70° C. in vacuo. A four hundred gram sample of this dried extract was then vigorously stirred into a 5 liter portion of ethyl acetate containing 1300 mls. of acetic anhydride at room temperature. One hundred mls. of 70% perchloric acid catalyst were then gradually stirred into the mixture over a period of 10 to 15 minutes whereupon the temperature rose to about 50° C. A dark brown slurry that formed in the mixture prior to addition of the catalyst dissolved during the acetylation. Mixing of the solution was continued for about 15 minutes after all the catalyst had been added, to insure completion of acetylation, whereupon the solution was cooled down to about 15° C. in a water bath and two liters of cold water stirred in. The color of the solution lightened and dense crystals of the colorless crystalline acetate of plicatic acid started to form. Stirring was continued for one hour after which the solution was permitted to stand at ambient temperature overnight. The crystalline acetate was filtered out, washed with methanol in which it is quite insoluble (about 0.2% at the boil), rewashed with hot methanol and then dried. Yields ranged from about 70 to 80% based on the weight of the plicatic acid in the source material. The colorless acetate obtained in this manner has a melting point of 234° C., and can be recrystallized from nitromethane or ethoxyethanol.

Example 2

The colorless crystalline acetate of plicatic acid can be prepared more efficiently and in higher yield from pure plicatic acid than from mixtures containing the same such as spray dried aqueous extracts of western red cedar wood. Even starting with substantially pure plicatic acid, however, a 100% conversion cannot be attained. Either there are isomers present in the acid that react differently during acetylation or side reactions occur that compete therewith. The following acetylation of substantially pure plicatic acid illustrates this fact.

A sample of plicatic acid, separated by the process of Langille and Gray, as set forth in the above identified application S.N. 386,429, from the other components present in an aqueous extract of western red cedar wood, was purified by repeated countercurrent ethyl acetate-water extractions and lyophilizations. After drying, two grams of this purified plicatic acid were dissolved in 30 ml. of ethyl acetate containing 7.5 grams of acetic anhydride and thoroughly mixed. 0.6 gram of 70% perchloric acid catalyst were then slowly stirred into the mixture and the stirring continued for 35 minutes. The crystalline acetate formed in this manner was precipitated from solution by cooling the mixture to 15° C., stirring in 150 ml. of cold water and letting the diluted mixture stand overnight. A yield of 1.76 grams was obtained which was equivalent to 88% based on the weight of the plicatic acid.

Example 3

This example illustrates the hydrolytic deacetylation of the colorless crystalline acetate of plicatic acid into a yellow crystalline product in an acid media.

A sample of the crystalline acetate of plicatic acid prepared in Example 1 was carefully dissolved in concentrated sulfuric acid and permitted to stand at ambient temperatures for a few minutes. The solution was then slowly stirred into an excess of cold water to precipitate the yellow deacetylation product and permitted to stand overnight. After washing and drying a yield of bright yellow crystals was obtained equivalent to about 60% based on the weight of the acetate of plicatic acid used. It was also found that precipitation of the yellow product compound could be speeded up without loss in yield by boiling the dilute solution during the precipitation for about 5 minutes and cooling.

Example 4

This example illustrates the hydrolytic deacetylation of the crystalline acetate of plicatic acid in alkaline media.

A sample of the colorless crystalline acetate of plicatic acid formed in Example 1 was stirred into an excess of 2% sodium hydroxide solution at ambient temperatures. The plicatic acetate dissolved in the alkaline media to form a dark red-orange solution and was permitted to stand for 30 to 40 minutes to ensure completion of hydrolysis. An excess of concentrated hydrochloric acid was then stirred into the mixture whereupon a dense bright yellow precipitate formed that slowly settled out of solution. When precipitation was complete the yellow precipitate was filtered out, washed with water, then with 2% hydrochloric acid solution and then rewashed several times with cold water. After drying in vacuo the yield was found to be from about 35 to 50% by weight based on the weight of the plicatic acid used. I.R. spectrum analysis and melting point determinations indicated that the yellow crystalline products obtained in Examples 3 and 4 were identical deacetylation products of the colorless crystalline acetate of plicatic acid.

The crystalline acetate of plicatic acid produced by the procedures described in Examples 1 and 2 was found by chemical analysis and by infrared and NMR spectrography to have the empirical and structural formula hereinbefore noted.

| Analysis, percent of— | Chemical analysis for $C_{32}H_{30}O_{14} \cdot 2H_2O$ | |
|---|---|---|
| | Theory | Found |
| C | 57.0 | 56.18 |
| H | 5.05 | 4.98 |
| O | 38.0 | 37.51 |
| Methoxyl | 9.20 | 8.79 |
| Acetyl | 31.9 | 33.48 |

The yellow compound produced by the procedures described in Examples 3 and 4 was found by chemical analysis and by infrared and NMR spectrography to have the empirical and tautomeric structural formula hereinbefore noted.

| Analysis, percent of— | Chemical analysis for $C_{24}H_{24}O_{11}$ | |
|---|---|---|
| | Theory | Found |
| C | 59.01 | 59.04 |
| H | 4.95 | 4.94 |
| Methoxyl | 12.69 | 12.64 |
| Acetyl | Nil | Nil |

It was further discovered that the yellow pigment can also be recrystallized from hydrochloric acid, acetic acid or formic acid. It has a melting point of 239° C., and is easily soluble in sodium bicarbonate solution but contains no free carboxylic acid since potentiometric titration gives no inflection point. On standing, a bicarbonate solution of the compound changes from red to green and an ammonia solution from orange to yellow. The yellow deacetylation compound is not appreciably soluble in water, ether, benzene, chloroform or methyl-ethyl ketone but is slightly soluble in hot methanol giving a yellow solution. It forms a variable green solution in dimethyl formamide and a reddish-purple solution in dimethyl sulfoxide. It dissolves slowly in pyridine to form a reddish-purple solution that slowly changes to yellow. Qualitative tests for phenolic groups using the diazo test of Feigl give positive results.

Attempted reacetylation of the yellow deacetylated compound by the same procedure used in acetylating the plicatic acid to the colorless crystalline acetate does not yield that compound. Instead a dark purple-blue product is obtained which changes to red at 137–140° C., and melts with decomposition at 174–176° C.

The yellow deacetylation product can also be methylated with diazomethane in methanol to give a 100% yield of a purple compound with a melting point of 145–148° C., and having a methoxyl content of 29.8%.

Finally, as previously stated, the yellow deacetylation compound is an excellent pigment for paint that is stable to light, a sample of the same showing no change in color when exposed to ultraviolet light of high intensity for 70 hours. On ball milling another sample of a commercial oil-base white paint containing titanium dioxide pigment to which had been added the yellow pigment in the ratio of 4 parts yellow pigment to 10 parts of titanium dioxide therein the resultant product gave a rich yellow-colored film with good coverage.

Other catalysts found to be effective in varying degrees for acetylating the plicatic acid include $BF_3$ and $BF_3$ plus HF.

I claim:

1. The process for the acetylation of plicatic acid which comprises reacting a solution of plicatic acid with acetic anhydride in the presence of a catalyst selected from the group consisting of perchloric acid, $BF_3$ and $BF_3$ plus HF, and adding water to the resultant reaction solution to precipitate a colorless crystalline acetate of plicatic acid therefrom, said crystalline acetate product having a melting point of 234° C. and the following structural formula:

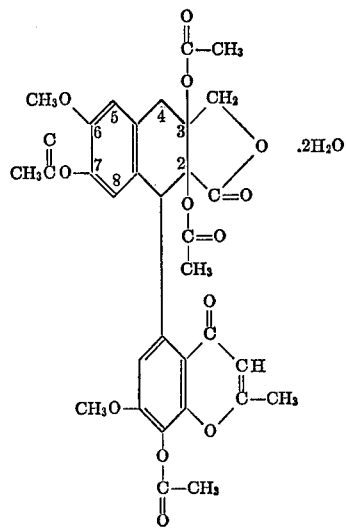

2. The process according to claim 1 in which the plicatic acid is first dissolved in ethyl acetate and then acetic anhydride and the catalyst are added to this solution and mixed therewith.

3. The process according to claim 1 in which the acetylation reaction is carried out in the presence of perchloric acid as the catalyst for said reaction.

4. The colorless crystalline acetate of plicatic acid having the melting point of 234° C. and the following structural formula:

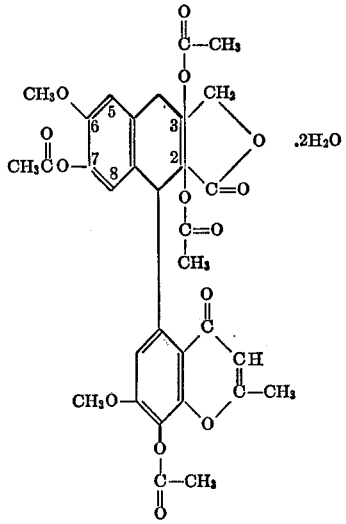

References Cited

Wagner and Zook: Synthetic Organic Chemistry, New York (1953), section 287 or Wiley & Sons, pp. 482–483 relied on.

ALEX MAZEL, Primary Examiner

A. M. T. TIGHE, Assistant Examiner

U.S. Cl. X.R.

260—345.2, 520; 8—30, 54.2; 106—300